J. W. LEWIS.
TONGS.
APPLICATION FILED APR. 12, 1910.
967,791.
Patented Aug. 16, 1910.
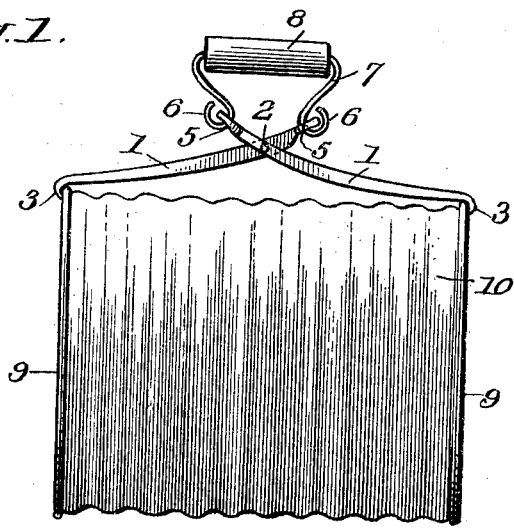
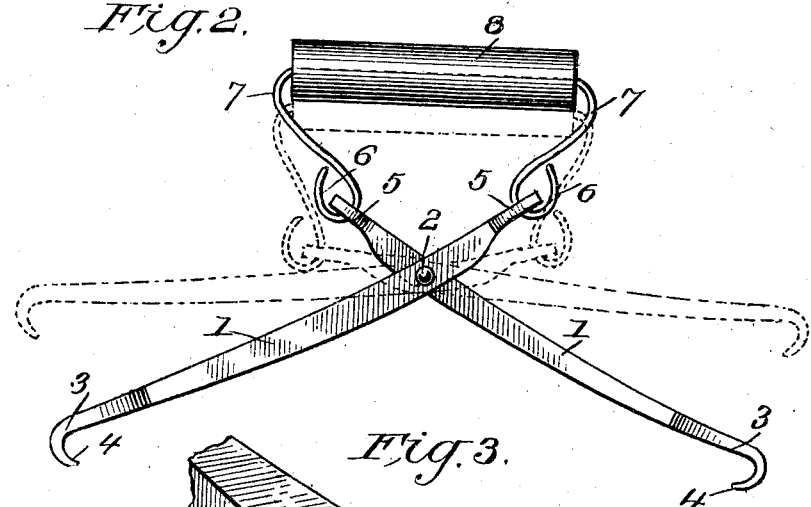
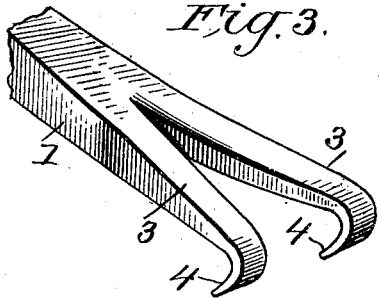
Witnesses
Inventor
J. W. Lewis
By
Attorneys

UNITED STATES PATENT OFFICE.

JOHN W. LEWIS, OF NEFFS, OHIO.

TONGS.

967,791.

Specification of Letters Patent. Patented Aug. 16, 1910.

Application filed April 12, 1910. Serial No. 554,911.

*To all whom it may concern:*

Be it known that I, JOHN W. LEWIS, a citizen of the United States, residing at Neffs, in the county of Belmont and State of Ohio, have invented certain new and useful Improvements in Tongs, of which the following is a specification.

This invention has for its object a simple, inexpensive, durable and efficient construction of tongs, designed particularly for use in carrying powder kegs or similar cylindrical receptacles that are formed at the ends with rim flanges, and the invention consists in certain constructions and arrangements of the parts that I shall hereinafter fully describe and claim.

For a full understanding of the invention, reference is to be had to the following description and accompanying drawings, in which:

Figure 1 is a side elevation showing the application of my device; Fig. 2 is a similar view of the device detached and on an enlarged scale; and Fig. 3 is an enlarged fragmentary perspective view of the hooked end of one tong member.

Corresponding and like parts are referred to in the following description and indicated in all the views of the drawings by the same reference characters.

My improved tongs comprise corresponding members 1 that are pivotally connected together near one end, as indicated at 2, and that are formed at their lower ends with forked claws 3, each of which preferably embodies two diverging members which terminate in hooks 4, said hooks preferably lying in the same transverse plane, whereby when they engage the rim flange of a powder keg or the like, they will tend to bite into the flange and thereby maintain a secure hold.

The upper ends of the members 1 are formed with eyes 5 in which loops 6 are engaged, said loops being formed on the ends of a spring wire bail 7 upon which is mounted a preferably wooden hand-grip 8. It is to be particularly noted that the two ends of the bails 7 converge and are so spaced apart at their looped extremities that they will hold the members in such angular relation to each other that the claws 3 will preferably come slightly short of passing over the rim flanges 9 of a powder keg 10. Hence it will be understood that in the preferred practical use of my device, in order to apply the same to the keg, it is only necessary to grasp the handle 8 and apply the claw ends 3 of the member 1 to the keg near the ends thereof, whereupon a downward pressure on the handle will move the claws 3 farther apart so that they may slip down over and into engagement with the rim flanges 9, against the tension of the bail 7, the downward pressure being thereupon removed so as to permit the converging ends of the bail to spring together and securely draw the claws 3 into firm engagement with the rim flanges 9. Manifestly, as the tongs are then lifted, the weight of the keg will materially assist in maintaining a firm connection with the tongs.

From the foregoing description in connection with the accompanying drawing, it will be seen that I have provided a very simple and inexpensive pair of tongs which may be cheaply manufactured out of bar iron or the like, a single piece of spring wire for the bails 7 and a wooden roller 8 for the handle, that the device will be light and capable of being easily manipulated to secure it to and disconnect it from the powder keg or similar cylindrical receptacle with rim flanges, and that when once secured to the receptacle it will maintain a firm grip thereon and avoid any liability of dropping the article being carried.

Having thus described the invention, what is claimed as new is:

The herein described tongs for carrying powder kegs comprising crossed members pivotally connected together intermediate of their ends, said members being formed at their lower ends with inwardly turned and curved claws, said members being formed at their upper ends with eyes, a spring bail formed with converging ends that are provided at their extremities with loops engaging in the eyes and spaced apart a predetermined distance whereby to normally hold, in the unflexed condition of the bail, the lower ends of said members apart a distance less than the ordinary length of a powder keg, and a handle rotatably mounted on the bail.

In testimony whereof, I affix my signature in presence of two witnesses.

JOHN W. LEWIS. [L. S.]

Witnesses:
S. A. SCOTT,
W. T. MORRIS.